(12) United States Patent
Kwon

(10) Patent No.: US 8,549,873 B2
(45) Date of Patent: Oct. 8, 2013

(54) HEAT EXCHANGER, WELDING MEMBER AND AIR CONDITIONER

(75) Inventor: Yong Sam Kwon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 384 days.

(21) Appl. No.: 12/926,477

(22) Filed: Nov. 19, 2010

(65) Prior Publication Data

US 2011/0146338 A1 Jun. 23, 2011

(30) Foreign Application Priority Data

Dec. 21, 2009 (KR) ........................ 10-2009-0128232

(51) Int. Cl.
*F25B 1/00* (2006.01)

(52) U.S. Cl.
USPC .............................. 62/498; 62/515

(58) Field of Classification Search
USPC .............. 62/498, 515; 165/162, 161; 428/576
See application file for complete search history.

(56) References Cited

U.S. PATENT DOCUMENTS

| | | | | |
|---|---|---|---|---|
| 3,630,276 | A * | 12/1971 | Paine et al. .................... | 165/158 |
| 4,183,401 | A * | 1/1980 | Bell et al. ...................... | 165/159 |
| 4,235,081 | A * | 11/1980 | Dowling ........................... | 62/93 |
| 4,365,487 | A * | 12/1982 | Dobney .......................... | 62/498 |
| 6,431,261 | B2 * | 8/2002 | Nishimura et al. ............. | 165/81 |

* cited by examiner

*Primary Examiner* — Mohammad M Ali
(74) *Attorney, Agent, or Firm* — Staas & Halsey LLP

(57) ABSTRACT

A heat exchanger includes a shell communicating with a first fluid inlet pipe and a first fluid outlet pipe, end caps coupled to ends of the shell to communicate with a second fluid inlet pipe and a second fluid outlet pipe, a plurality of tubes disposed in the shell to constitute a channel through which a second fluid flows, an end baffle located at ends of the tubes to prevent mixing of a first fluid and the second fluid, and a first plate to fill gaps between the tubes and the end baffle.

11 Claims, 6 Drawing Sheets

HEAT EXCHANGER, WELDING MEMBER AND AIR CONDITIONER

CROSS-REFERENCE TO RELATED APPLICATIONS

This application claims the benefit of Korean Patent Application No. 2009-0128232, filed on Dec. 21, 2009 in the Korean Intellectual Property Office, the disclosure of which is incorporated herein by reference.

BACKGROUND

1. Field

Embodiments relate to a welding member to prevent leakage of a refrigerant in a shell and tube type heat exchanger which is a component of an air conditioner and a heat exchanger to which the welding member is applied.

2. Description of the Related Art

Generally, an air conditioner includes a compressor, a condenser, an expansion valve and an evaporator. In recent years, an additional heat exchanger has been used to maximize evaporation efficiency through heat exchange between refrigerants discharged from the condenser and the evaporator.

The heat exchanger performs heat exchange through direct or indirect contact between fluids having different temperatures. For heating or warming, the heat exchanger is widely used in automobiles, refrigerators, buildings, air conditioners, petrochemical industry, general chemical industry, power plants, etc.

An example of the heat exchanger is a shell and tube type heat exchanger. In the shell and tube type heat exchanger, heat exchange is performed between a fluid flowing inside a tube and a fluid flowing outside the tube.

In the shell and tube type heat exchanger, heat exchange is performed through indirect contact between different fluids. In this heat exchanger, a tube and a baffle may be used to prevent direct mixing of the fluids.

The baffle may be coupled to the tube by welding. To this end, a brass liquid is injected between the baffle and the tube, and then the baffle and the tube are placed in a welding furnace where welding between the baffle and the tube is performed.

However, the brass liquid may not be uniformly injected between the tube and the baffle, and therefore, welding defects may occur.

As a result, the different fluids may be mixed with each other through poorly welded portions, resulting in abrupt lowering of heat exchange efficiency and fatal damage to a compressor connected to the shell and tube type heat exchanger.

SUMMARY

It is an aspect to provide a welding member to reduce welding defects between a tube and a baffle of a shell and tube type heat exchanger and a welding method using the same.

It is another aspect to provide a welding member to reduce manufacturing costs and improve productivity through automatic welding between the tube and the baffle and a welding method using the same.

Additional aspects will be set forth in part in the description which follows and, in part, will be apparent from the description, or may be learned by practice of the embodiments.

In accordance with one aspect, a heat exchanger includes a shell communicating with a first fluid inlet pipe and a first fluid outlet pipe, end caps coupled to ends of the shell to communicate with a second fluid inlet pipe and a second fluid outlet pipe, a plurality of tubes disposed in the shell to constitute a channel through which a second fluid flows, an end baffle located at ends of the tubes to prevent mixing of a first fluid and the second fluid, and a first plate to fill gaps between the tubes and the end baffle.

The heat exchanger may further include a support baffle coupled to an inner circumference of the shell to support the tubes and a second plate to fill gaps between the tubes and the support baffle.

The first plate and the second plate may have a plurality of holes through which the tubes extend.

The first plate and the second plate may have a thickness of 0.2 mm to 0.5 mm.

The first plate may be melted in a welding furnace to automatically fill the gaps between the tubes and the end baffle.

The second plate may be melted in a welding furnace to automatically fill the gaps between the tubes and the support baffle.

The first plate and the second plate may be made of brass.

The second plate may be provided at one side thereof with a cutout portion.

The first fluid may include a gas refrigerant.

The second fluid may include a liquid refrigerant.

In accordance with another aspect, a welding member to hermetically fill gaps between a plurality of tubes and a baffle used in a shell and tube type heat exchanger includes a plurality of holes through which the tubes extend, the welding member being disposed at a front and/or a rear of the baffle.

The welding member may have a thickness of 0.2 mm to 0.5 mm.

The welding member may be made of brass.

The welding member may be melted in a welding furnace to automatically fill gaps between the tubes and the baffle.

The welding member may be provided at one side thereof with a cutout portion.

In accordance with a further aspect, an air conditioner includes a compressor to compress a refrigerant, a condenser to condense the compressed high-temperature and high-pressure refrigerant, a heat exchanger to supercool the refrigerant, an expansion device to decompress the refrigerant into a low temperature refrigerant, and an evaporator to evaporate the low-temperature refrigerant, wherein the heat exchanger includes a shell, end caps coupled to ends of the shell, a plurality of tubes disposed in the shell, an end baffle located at ends of the tubes, and a first plate to fill gaps between the tubes and the end baffle.

The heat exchanger may further include a support baffle coupled to an inner circumference of the shell to support the tubes and a second plate to fill gaps between the tubes and the support baffle.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
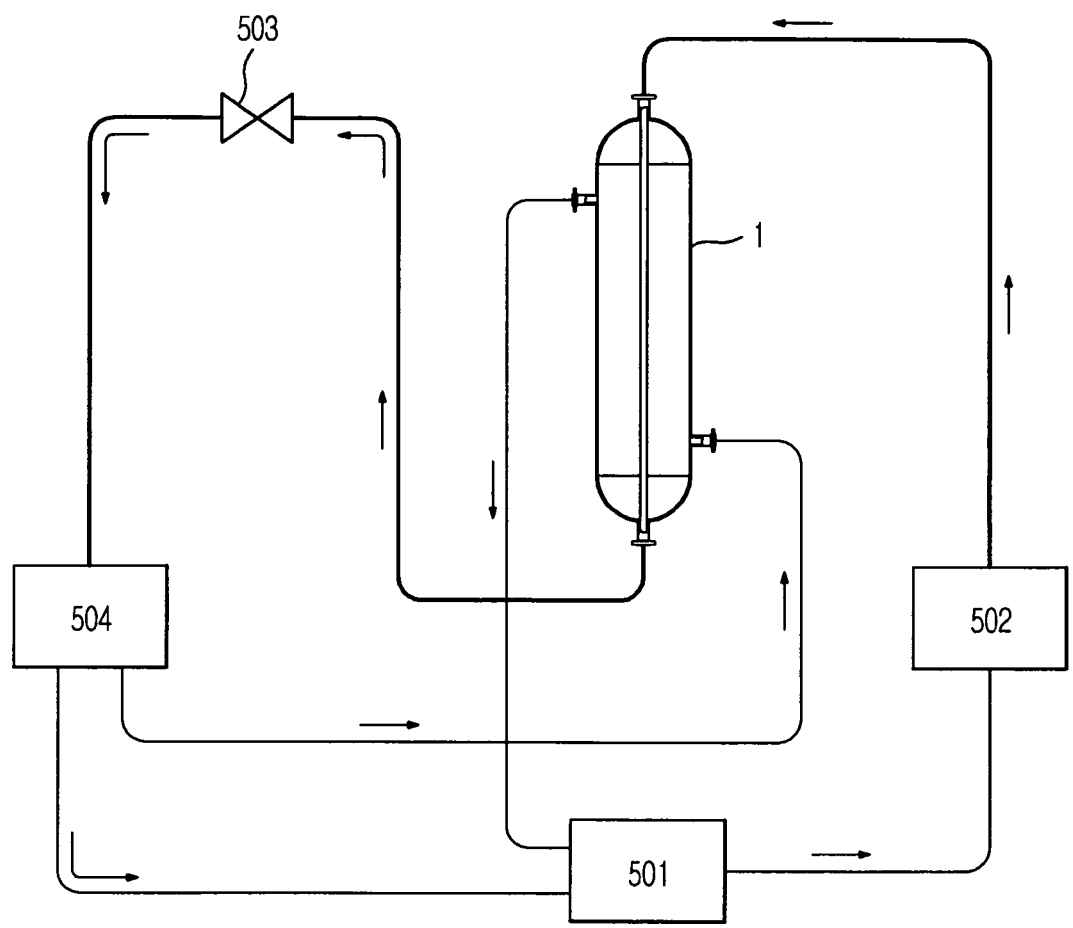
FIG. 1 is a refrigerant flow diagram of an air conditioner with a heat exchanger according to an embodiment.

Reference will now be made in detail to the embodiments of the present invention, examples of which are illustrated in the accompanying drawings, wherein like reference numerals refer to like elements throughout.

FIG. 1 is a refrigerant flow diagram of an air conditioner 500 with a heat exchanger according to an embodiment.

As shown in FIG. 1, the air conditioner 500 includes a compressor 510 to compress a refrigerant, a condenser 502 to perform heat exchange between the compressed high-temperature and high-pressure refrigerant and air, a heat exchanger 1 to supercool the refrigerant discharged from the condenser 502, an expansion device 503 to decompress the refrigerant discharged from the heat exchanger 1 into a low temperature refrigerant, and an evaporator 504 connected to the expansion device 503 to perform heat exchange between the low-temperature refrigerant and air to decrease the temperature of the air.

A refrigerant flows in the air conditioner 500 with the above-stated construction as follows.

A low-temperature and low-pressure gas refrigerant passes through the compressor 501 where the refrigerant is compressed into a high-temperature and high-pressure refrigerant and passes through the condenser 502 where the refrigerant is changed into a liquid refrigerant. The liquid refrigerant passes through the heat exchanger 1 where heat exchange between the liquid refrigerant and a low-temperature and low-pressure gas refrigerant discharged from the evaporator 504 is performed to supercool the liquid refrigerant. The supercooled refrigerant passes through the expansion device 503 and the evaporator 504 where the refrigerant is evaporated into a low-temperature and low-pressure gas refrigerant. At this time, some of the gas refrigerant discharged from the evaporator 504 passes through the heat exchanger 1 where the gas refrigerant is heat-exchanged with the liquid refrigerant having passed through the condenser 502.

That is, the heat exchanger 1 performs heat exchange between the liquid refrigerant having passed through the compressor 501 and the low-temperature and low-pressure gas refrigerant discharged from the evaporator 504 to supercool the liquid refrigerant, thereby further improving ambient heat absorption efficiency.

Figure 2:
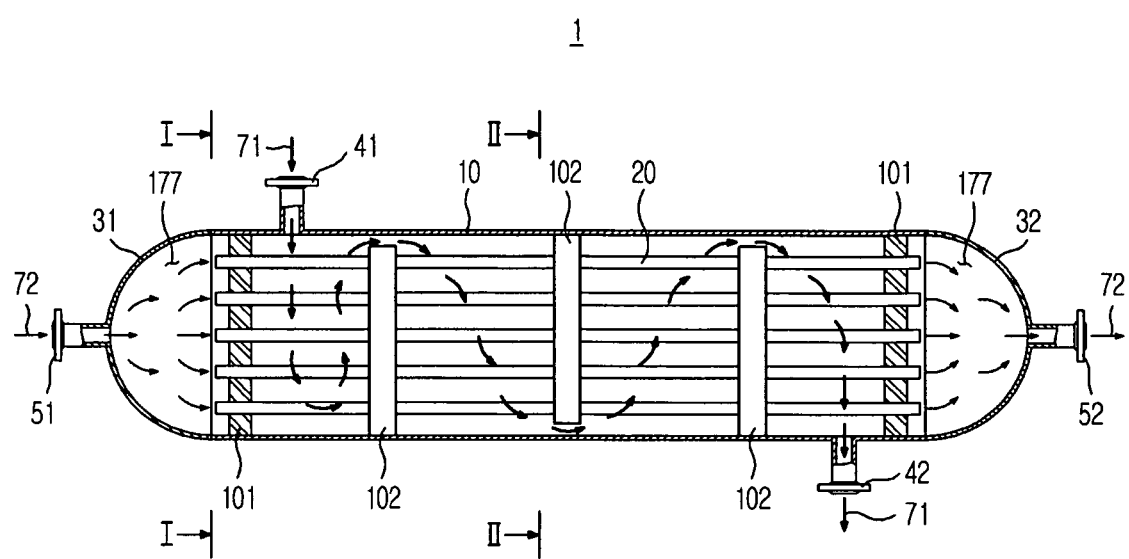
FIG. 2 is a schematic sectional view illustrating a heat exchanger according to an embodiment.

FIG. 2 is a schematic sectional view illustrating a heat exchanger 1 according to an embodiment.

As shown in FIG. 2, the heat exchanger 1 includes a shell 10 forming the external appearance thereof, a plurality of tubes 20 disposed in the shell 10 to constitute a flow channel of a second fluid 72, and end caps 31 and 32 coupled to ends of the shell 10.

At sides of the shell 10 are mounted a first fluid inlet pipe 41 through which a first fluid 71 is introduced and a first fluid outlet pipe 42 through which the first fluid 71 is discharged.

The end caps 31 are coupled to the opposite ends of the shell 10. The first end cap 31 is connected to a second fluid inlet pipe 71 through which the second fluid 72 is introduced, and the second end cap 32 is connected to a second fluid inlet pipe 72 through which the second fluid 72 is discharged.

End baffles 101 and support baffles 102 are coupled to the tubes 20.

The end baffles 101 are coupled to the respective ends of the tubes 20 to constitute hermetically sealed spaces 177 to receive the second fluid 72 with the first end cap 31 and the second end cap 32.

Figure 4:
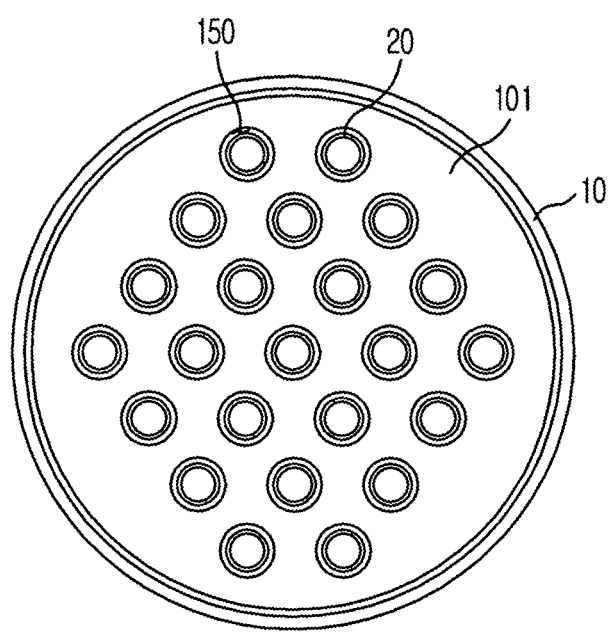
FIG. 4 is a sectional view illustrating gaps between a plurality of tubes and an end baffle before insertion of the welding member along line I-I of FIG. 2.

The end baffles 101 are welded to the tubes 20 via first plates 201 (see FIG. 4).

The support baffles 102 are coupled to the tubes 20 while contacting the inner circumference of the shell 10. One or more support baffles 102 are arranged in the longitudinal direction of the tubes 20.

Figure 5:
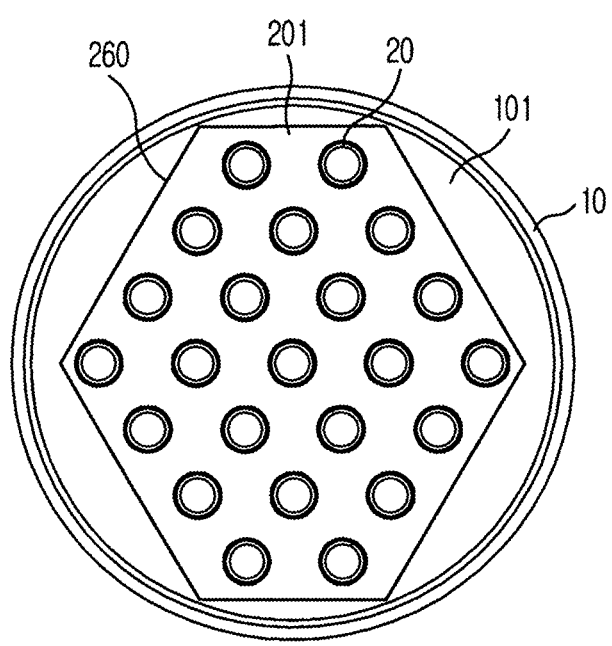
FIG. 5 is a plan view illustrating a first plate located on the end baffle before welding of the first plate along line I-I of FIG. 2.

The support baffles 102 are welded to the tubes 20 via second plates 202 (see FIG. 5).

In the heat exchanger 1 with the above-stated construction, the second fluid 72 introduced through the second fluid inlet pipe 51 flows to the second fluid outlet pipe 52 connected to the second end cap 32 via the first end cap 31 and the tubes 20, and the first fluid 71 introduced through the first fluid inlet pipe 41 formed at the shell 10 passes around the tubes 20 to be heat-exchanged with the second fluid 72.

The support baffles 102 function to uniformly maintain intervals of the tubes 20 and to prevent shaking or vibration of the tubes 20 due to flow of the second fluid 72. The end baffles 101 function to prevent mixing of the first fluid 71 and the second fluid 72 in addition to the functions of the support baffles 102.

A gas refrigerant may be used as the first fluid 71, and a liquid refrigerant may be used as the second fluid 72.

Hereinafter, a welding member 200 for a heat exchanger according to an embodiment and a welding method using the same will be described in detail.

Figure 3:
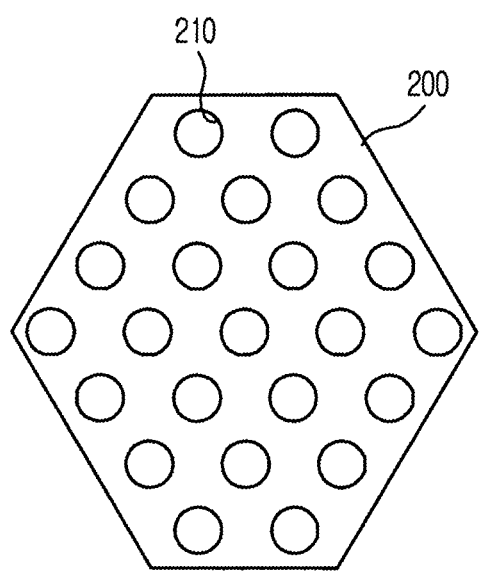
FIG. 3 is a plan view illustrating a welding member for a heat exchanger according to an embodiment.
Figure 6:
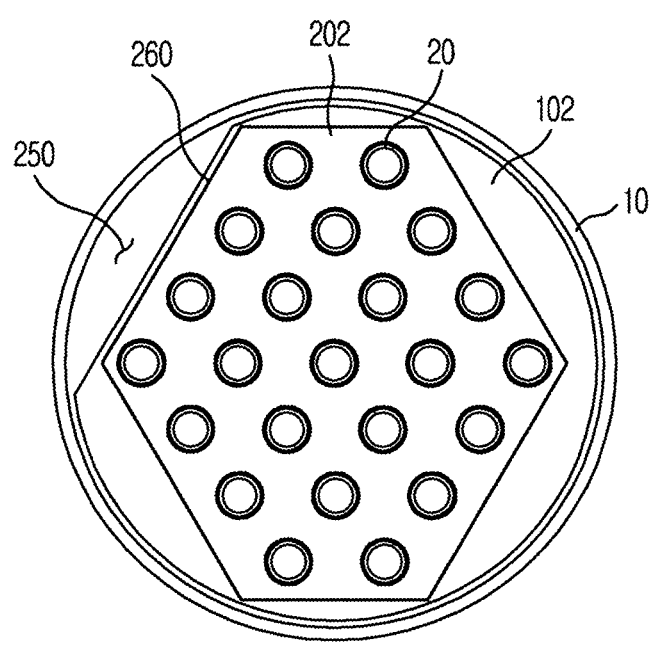
FIG. 6 is a plan view illustrating a second plate located on a support baffle before welding of the second plate along line II-II of FIG. 2.

FIG. 3 is a plan view illustrating a welding member 200 for a heat exchanger according to an embodiment. FIG. 4 is a sectional view illustrating gaps 150 between the tubes 20 and an end baffle 101 before insertion of the welding member 200 along line I-I of FIG. 2. FIG. 5 is a plan view illustrating a first plate 201 located on the end baffle 101 before welding of the first plate 201 along line I-I of FIG. 2. FIG. 6 is a plan view illustrating a second plate 202 located on a support baffle 102 before welding of the second plate 202 along line II-II of FIG. 2.

As shown in FIG. 3, the welding member 200 is of a size sufficient to be inserted into the shell 10 of the heat exchanger 1. The welding member 200 has a plurality of holes 210 through which the tubes 20 extend.

In FIG. 3, the welding member 200 is formed in a hexagonal shape although the welding member 200 may be formed in various different shapes, such as a polygon, a circle, and an oval, as long as the welding member 200 is inserted into the shell 10.

Also, the welding member 200 may have a thickness t of 0.2 mm to 1 mm. In this embodiment, the welding member 200 has a thickness t of 0.3 mm.

The welding member 200 may be made of brass.

When manufactured with the above-described thickness and material, the welding member 200 is automatically melted in a high-temperature electric welding furnace.

As shown in FIG. 4, the end baffle 101 is fitted on ends of the tubes 20.

The end baffle 101 has the same shape (in this embodiment, a circular shape) as the section of the shell 10 forming the external appearance of the heat exchanger 1. The end baffle 101 has a plurality of holes through which the tubes 20 extend.

As previously described, the end baffle 101 constitutes the hermetically sealed space 177 with the end cap 31 or 32 to prevent mixing of the first fluid 71 and the second fluid 72. To this end, the end baffle 101 is in tight contact with the tubes 20.

In a method of fitting the end baffle 101 on the tubes 20 to assemble the end baffle 101 and the tubes 20, however, the holes of the end baffle 101 have a greater diameter than the tubes 20, which are circular, with the result that gaps 150 are formed between the holes of the end baffle 101 and the tubes 20.

For this reason, the welding member 200 is provided to fill the gaps 150.

As shown in FIG. 5, the first plate 201 is fitted on the tubes 20 to be located at the front or rear of the end baffle 101.

The first plate 201 is made of brass having a thickness t of 0.2 mm to 1 mm. The first plate 201 is melted in an electric welding furnace to automatically fill the gaps 150 between the end baffle 101 and the tubes 20.

More uniform welding than conventional manual injection of a brass liquid is achieved through the use of the first plate 201.

Also, even welding is achieved even at spots which the brass liquid does not reach when the brass liquid is manually injected.

The gaps 150 between the end baffle 101 and the tubes 20 are uniformly and evenly filled to considerably lower a defect rate of the heat exchanger due to leakage of the fluids.

The manual brass liquid injection is not performed, with the result that production time is shortened and the defect rate of the heat exchanger is lowered, thereby improving productivity.

As shown in FIG. 6, the second plate 202 is fitted on the tubes 20 to be located at the front or rear of the support baffle 102.

The second plate 202 is made of brass having a thickness t of 0.2 mm to 1 mm. The second plate 202 is melted in an electric welding furnace to automatically fill gaps (not shown) between the support baffle 102 and the tubes 20.

The gaps between the support baffle 102 and the tubes 20 are uniformly and evenly filled through the use of second plate 202. As a result, vibration generated during passage of the second fluid 72 in the tubes 20 and noise generated by such vibration are minimized.

In addition, the second plate 202 has the same effects as the first plate 201 such as improved productivity.

The first plate 201 and the second plate 202 may be commonly used.

The first plate 201 may be of a size sufficient to be inserted into the shell 10 as previously described. On the other hand, the second plate 202 is provided at one side thereof with a cutout portion 260 constituting a space 250 through which the first fluid passes.

As shown in FIGS. 5 and 6, the first plate 201 and the second plate 202 are formed in a hexagonal shape. This is because one side of the hexagon may be used as the cutout portion 260 constituting the space 250 through which the first fluid passes.

Of course, the first plate 201 and the second plate 202 may be formed in various different shapes, such as a polygon, a circle, and an oval, as long as each of the first and second plates 201 and 202 is inserted into the shell 10 and is provided at one side thereof with the cutout portion 250 constituting the space 250 through which the first fluid passes.

As is apparent from the above description, welding defects between the tubes and the baffles are reduced according to the embodiments.

Also, even slight leakage of different fluids is prevented, and therefore, direct mixing of the fluids is prevented, thereby lowering a breakdown rate of the heat exchanger.

In addition, welding is automatically performed, thereby reducing manufacturing costs and improving productivity.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A heat exchanger comprising:
a shell communicating with a first fluid inlet pipe and a first fluid outlet pipe;
end caps coupled to ends of the shell to communicate with a second fluid inlet pipe and a second fluid outlet pipe;
a plurality of tubes disposed in the shell to constitute a channel through which a second fluid flows;
an end baffle located at ends of the tubes to prevent mixing of a first fluid and the second fluid;
a first plate to fill gaps between the tubes and the end baffle;
a support baffle coupled to an inner circumference of the shell to support the tubes; and
a second plate to fill gaps between the tubes and the support baffle.

2. The heat exchanger according to claim 1, wherein the first plate and the second plate have a plurality of holes through which the tubes extend.

3. The heat exchanger according to claim 2, wherein the first plate and the second plate have a thickness of 0.2 mm to 0.5 mm.

4. The heat exchanger according to claim 3, wherein the first plate is melted in a welding furnace to automatically fill the gaps between the tubes and the end baffle.

5. The heat exchanger according to claim 3, wherein the second plate is melted in a welding furnace to automatically fill the gaps between the tubes and the support baffle.

6. The heat exchanger according to claim 3, wherein the first plate and the second plate are made of brass.

7. The heat exchanger according to claim 6, wherein the second plate is provided at one side thereof with a cutout portion.

8. The heat exchanger according to claim 1, wherein the first fluid comprises a gas refrigerant.

9. The heat exchanger according to claim 1, wherein the second fluid comprises a liquid refrigerant.

10. An air conditioner comprising a compressor to compress a refrigerant, a condenser to condense the compressed high-temperature and high-pressure refrigerant, a heat exchanger to supercool the refrigerant, an expansion device to decompress the refrigerant into a low temperature refrigerant, and an evaporator to evaporate the low-temperature refrigerant, wherein the heat exchanger comprises:
a shell;
end caps coupled to ends of the shell;
a plurality of tubes disposed in the shell;
an end baffle located at ends of the tubes; and
a first plate to fill gaps between the tubes and the end baffle.

11. The air conditioner according to claim 10, wherein the heat exchanger further comprises:
a support baffle coupled to an inner circumference of the shell to support the tubes; and
a second plate to fill gaps between the tubes and the support baffle.

* * * * *